(12) United States Patent
Pasalov et al.

(10) Patent No.: US 11,757,266 B2
(45) Date of Patent: Sep. 12, 2023

(54) APPARATUS FOR CLOSING A VENTILATION OPENING IN A HOUSING OF A SWITCH GEAR AND A SWITCH GEAR COMPRISING SUCH AN APPARATUS

(71) Applicant: ABB Schweiz AG, Baden (CH)

(72) Inventors: Tomas Pasalov, Moravany (CZ); Adam Ondricek, Tisnov (CZ); Pavel Vrbka, Nedvedice (CZ)

(73) Assignee: ABB Schweiz AG, Baden (CH)

( * ) Notice: Subject to any disclaimer, the term of this patent is extended or adjusted under 35 U.S.C. 154(b) by 7 days.

(21) Appl. No.: 17/503,393

(22) Filed: Oct. 18, 2021

(65) Prior Publication Data
US 2022/0190565 A1     Jun. 16, 2022

(30) Foreign Application Priority Data
Dec. 14, 2020 (EP) .................................. 20213717

(51) Int. Cl.
*H02B 1/56* (2006.01)
*H02B 13/025* (2006.01)

(52) U.S. Cl.
CPC ........... *H02B 13/025* (2013.01); *H02B 1/565* (2013.01)

(58) Field of Classification Search
CPC ..... H02B 1/565; H02B 13/025; H05K 5/0213
USPC ......... 218/157, 155; 454/221, 238, 255, 327
See application file for complete search history.

(56) References Cited

U.S. PATENT DOCUMENTS 8,791,361 B2 * 7/2014 Gingrich ................ H02B 1/565
361/605
9,472,925 B2 * 10/2016 Zende .................. H02B 13/025
9,516,784 B2 * 12/2016 Pawar ................ H05K 7/20145
9,525,276 B2 * 12/2016 Farr .......................... H02B 1/56
9,609,769 B2 * 3/2017 Kingston ............... H02B 1/565
10,326,259 B2 * 6/2019 Bellows ............... H05K 5/0213

(Continued)

FOREIGN PATENT DOCUMENTS

| CN | 209046094 U | | 6/2019 | |
|---|---|---|---|---|
| DE | 102012210279 | * | 9/2013 | ............. H02B 1/565 |

(Continued)

OTHER PUBLICATIONS

Translation of DE102012210279 (Original document published p. Sep. 5, 2013) (Year: 2013).*

(Continued)

*Primary Examiner* — William A Bolton
(74) *Attorney, Agent, or Firm* — Leydig, Voit & Mayer, Ltd.

(57) ABSTRACT

An apparatus for closing a ventilation opening in a housing of a switch gear in the event of a sudden increase in pressure caused by electric arcing. The apparatus includes a frame which is adapted to be coupled to the housing of the switch gear adjacent the opening, a flap pivotally mounted at the frame, the flap being adapted to be moved from an open position in which the flap overlaps the ventilation opening keeping a gap which allows an airflow through the opening, into a closed position, in which the flap fully covers the opening and blocks the air flow, spring elastic means which urge the flap into the open position, and a retaining element which is adapted to mechanically lock the flap in the closed position after pivoting the flap from the open position into the closed position.

11 Claims, 4 Drawing Sheets

(56) References Cited

U.S. PATENT DOCUMENTS

| | | | |
|---|---|---|---|
| 10,622,790 B2* | 4/2020 | Kim .......................... | H02B 1/30 |
| 2017/0170639 A1* | 6/2017 | Cormenier ................ | F28F 7/02 |

FOREIGN PATENT DOCUMENTS

| | | | |
|---|---|---|---|
| EP | 3483994 A1 | 5/2019 | |
| WO | WO 2009/001425 A1 | 12/2008 | |

OTHER PUBLICATIONS

European Patent Office, Extended European Search Report in European Patent Application No. 20213717.0, 4 pp. (dated Jun. 7, 2021).

* cited by examiner

APPARATUS FOR CLOSING A VENTILATION OPENING IN A HOUSING OF A SWITCH GEAR AND A SWITCH GEAR COMPRISING SUCH AN APPARATUS

CROSS-REFERENCE TO PRIOR APPLICATION

Priority is claimed to European Patent Application No. EP 20 213 717.0, filed on Dec. 14, 2020, the entire disclosure of which is hereby incorporated by reference herein.

FIELD

One or more embodiments of the present invention may be related to an apparatus for closing a ventilation opening in a housing of a switch gear in the event of arcing and a switch gear comprising such an apparatus.

BACKGROUND

Switch gears, like low voltage switch gears, usually comprise housings with walls, in which openings are formed through which outside air is circulated, in order to cool the electrical devices, which are accommodated in the interior of the housing.

In the event of a failure of an electrical device accommodated inside the substantially closed interior of a switchgear housing, there is the danger that electrical arcs are generated. When an electrical arc is ignited in the switchgear housing, the air around the arc is instantly heated up by the electric energy of the arc and start to expand around the arc in all directions, thereby generating a sudden increase in pressure inside the housing of the switchgear.

In a known prior art switch gear, the excess pressure is released from the inside of the substantially closed housing through the ventilation openings. As the gasses passing through the ventilation openings are hot, they are likely to cause burn injuries to persons who stand in front of an opening in case of arcing.

SUMMARY

In one or more embodiments, the present invention may provide an apparatus for closing a ventilation opening in a housing of a switch gear in the event of a sudden increase in pressure caused by electric arcing. The apparatus may include: a frame that is adapted to be coupled to the housing of the switch gear adjacent the ventilation opening; a flap pivotally mounted at the frame, the flap being adapted to be moved from an open position in which the flap overlaps the ventilation opening keeping a gap that allows an airflow through the ventilation opening, into a closed position, in which the flap fully covers the ventilation opening and blocks the air flow; and spring elastic means that urge the flap into the open position, and a retaining element that is adapted to mechanically lock the flap in the closed position after pivoting the flap from the open position into the closed position.

Accordingly, an object of one or more embodiments of the present invention may be to provide an apparatus which prevents the escape of hot gas from the interior of a switch gear through a ventilation opening in the event of electrical arcing.

A further object of one or more embodiments of the present invention may be to provide a switch gear which prevents operators from being injured by hot gas escaping through ventilation openings in the event of electrical arcing Further objects of one or more embodiments of the present invention may be described below.

BRIEF DESCRIPTION OF THE DRAWINGS

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3A is an associated enlarged view of a retaining element employed in the apparatus of FIG. 3.

DETAILED DESCRIPTION

Figure 1:
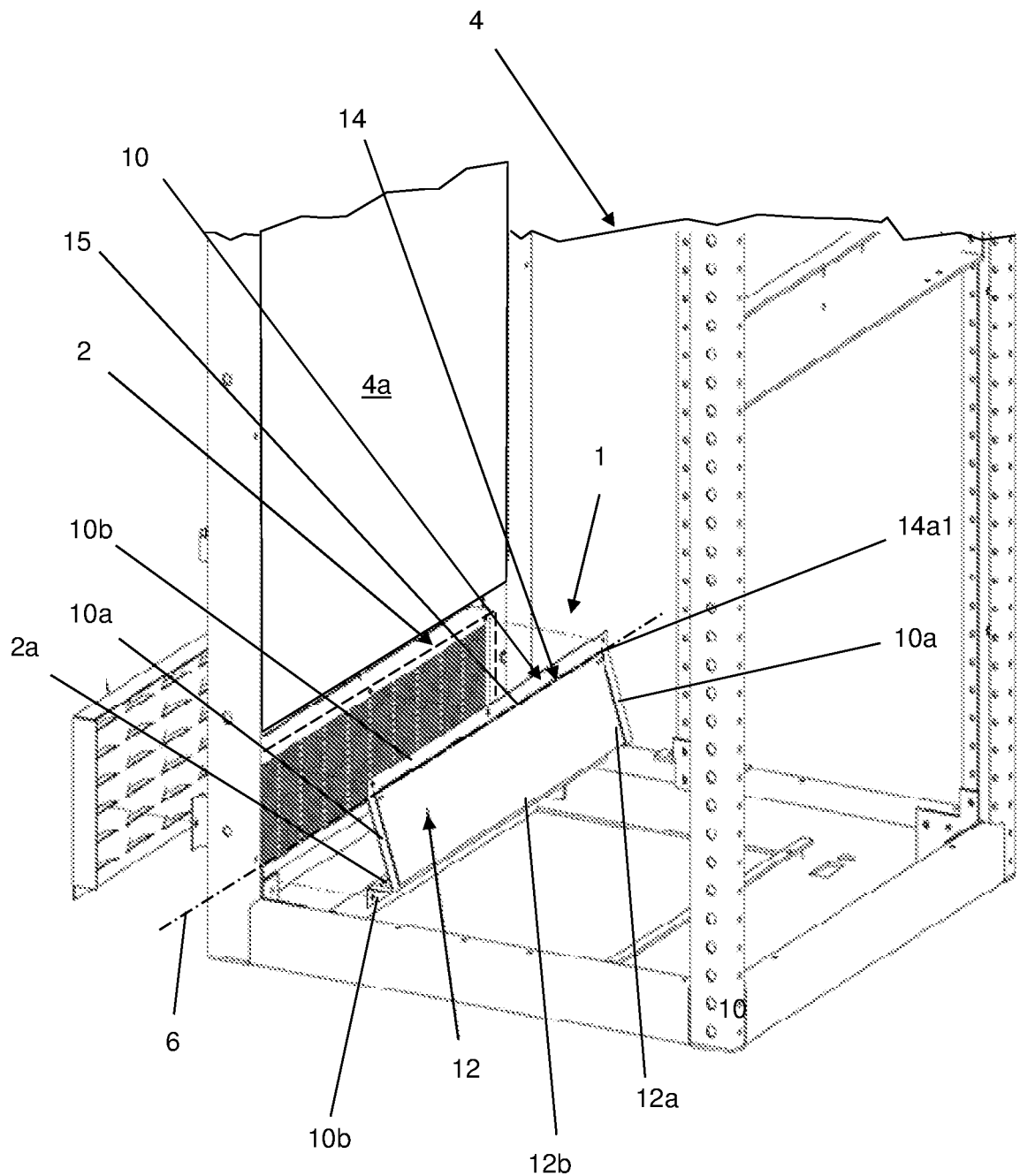
FIG. 1 is an exploded partial view of a switch gear housing, in which an apparatus according to one or more embodiments of the present invention is mounted to the inner side of a ventilation opening in one of the side walls, which is covered by a ventilation cover on the outer side of the housing.

According to one or more embodiments of the invention, an apparatus for closing a ventilation opening in a housing of a switch gear in the event of a sudden increase in pressure caused by electric arcing comprises a frame which is adapted to be coupled to the housing of the switch gear adjacent the opening. In a preferred embodiment, the frame is directly mounted to the inner or outer side wall of the housing of a switch gear which comprises the opening for feeding air into the interior of the housing or for extracting air therefrom. The apparatus comprises a flap which is pivotally mounted relative to the frame. The flap can be moved from an open position into a closed position. In the open position, the flap partially overlaps the ventilation opening in order to provide for a gap which allows an airflow through the opening, in order to circulate air through the interior of the housing. In the closed position, the flap preferably fully covers the opening and thereby blocks an air flow from the inside of the housing through the opening to the outside of the housing.

According to one or more embodiments of the invention, the flap is biased by spring elastic means which urge the flap to pivot into the open position, so that under normal conditions, the air for venting the inside of the housing of the switch gear can flow through the ventilation opening.

The apparatus further comprises a retaining element which is adapted to mechanically lock the flap in the closed position after pivoting it from the open position into the closed position against the forces which are applied to the flap by the spring elastic means. The pivoting forces may be caused by a sudden over pressure/pressure burst which occurs in the event of arcing inside the switch gear housing. This sudden overpressure acts on the effective area of the flap and pushes it into the closed position, in which it blocks the flow of air and is eventually locked by the retaining element. The effective area of the flap is the projection of the flap surface area onto the area of the ventilation opening. After an arcing event, the flap which instantly blocks the flow of hot air through the ventilation opening to the outside of the switch gear, and thereby stops any person standing in front of the opening from being injured by the hot and often toxic gases, may be manually released from the closed position before powering up the switch gear again.

In a preferred embodiment of the invention, the design of the flap is based on a sheet metal in which the shape of the flap is being punched out or cut out, e.g. by means of a laser or a water jet, so that the flap is integrally formed with the frame. The spring elastic element is formed as an angled connecting section which interconnects the frame with the flap. The spring elastic element is thus obtained by mechanically bending the sheet metal in the connecting section which bridges the cut-out flap with the cut-out frame at a desired angle of e.g. 45° or more, relative to plane of the frame.

This embodiment has the advantage that it can be manufactured at very low costs by simply punching or cutting out the frame, the connecting section and the flap integrally formed therewith as one piece from an even plate of sheet metal, and afterwards forming/bending the frame and the angled connecting section into the desired 3-dimensional shape such that the flap extends at a desired angle of e.g. 45° away from the plane of the frame.

In order to allow for a variation in the stiffness of the angled connecting section, this section may comprise two or more angled webs which interconnect the flap with the frame. In this embodiment, the width of the webs which determines the biasing force that urges the flap into the open position, can easily be adapted to a desired value by varying the length of a longitudinal aperture, which extends between two adjacent angled webs in the lateral direction of the angled connecting section. In other words, if it is desired, to raise the stiffness of the angled connecting section, the length of the aperture/s is reduced. In contrary hereto, the stiffness of the angled connecting section can be reduced by simply extending the length of each aperture e.g. by 1 to 5 mm or more, in order to reduce the widths of the angled webs. Thus, according to a basic idea behind one or more embodiments of the invention, the flap attachment to the main flap body is weakened so it can deform under a pressure generated by the arc which will close the ventilation gap and prevent the hot gases from passing through the ventilation area thus ensuring the safety of the operating personnel.

As applicant has found, it is advantageous to provide webs, e.g. two, three or even more webs, which all have the same width, in order to provide for a substantially uniform bending of the angled connecting section along the width of the flap when pivoting the flap into the closed position.

According to another aspect of the present invention, the retaining element may be arranged at the frame, preferably integrally formed with the frame from the same piece of sheet metal. In a preferred embodiment, the retaining element comprises a ramp section which is followed by a recessed section when viewed in the direction of the movement of the flap into the closed position. This ramp section, when viewed in the direction of movement of the flap into the closed position, increasingly projects sidewardly from the longitudinal edge portion of the frame into the passage of the flap. The ramp portion contacts an adjacent longitudinal edge portion of the flap when passing by, right before the flap reaches the close position. Due to the mechanical contact between the ramp portion and the corresponding edge portion of the flap, the flap is slightly deflected sidewardly due to the elastic properties of the sheet metal/resilient means so that it can pass by the ramp section and enter the adjoining recessed section following the ramp section. In the recessed section of the retaining element, which is located at a position which corresponds to the closed position of the flap, the flap flexes back from its deflected position past the ramp section into the free space provided by recessed section. Due to the longitudinal edge portion of the flap being pushed against the back side of the ramp section by the forces provided by the spring elastic means in the closed position of the flap, the flap is mechanically locked in the closed position in a form-locking manner.

According to another aspect of the present invention, the frame may comprise a stop which prevents the flap from pivoting beyond the closed position. This stop can be formed as a preferably integral part of the frame which, when viewed in the direction of movement of the flap into the closed position, projects into the passage of the flap downward of the recessed section of the retaining element. Optionally, the stop 18 may also be provided by the transversal edge portion of the frame, which extends in parallel to and along the transversal edge portion of the flap.

In order to cover larger ventilation openings having a clear height of e.g. 100 mm or more, e.g. 200 mm or 300 mm, the frame may comprise at least two (or even more) flaps which are arranged above each other in the same frame. In this embodiment, each flap is pivotally mounted to the frame and biased by an associated spring elastic means towards the open position which is formed at an additional transversal frame portion of the frame. In the same way as described herein before with regard to the Mono-Flap design, the spring elastic means associated with the further flap is formed by at least two angled webs, and the movement of the further flap back to the open position is blocked by a retaining element which interacts with the further flap. The size of both flaps is such that the flaps together commonly cover the ventilation opening and block the air flow in the closed position. For very large ventilation openings, there may even be provided three or more flaps which are arranged above each other in one and the same frame. In the same way as the Mono-Flap design, also the multi-flap designs can be punched or (laser) cut from one and the same even peace of sheet metal, which is afterwards bent into the 3-dimensional shape having an all-around frame with longitudinal frame portions which comprise a zigzag-shaped cross section.

According to another object of one or more embodiments of the present invention, the frame may be configured as an insert which comprises the flap/flaps, spring elastic means associated with each flap for pushing it into the open position and a corresponding retaining element associated therewith. The insert is adapted to be mounted in an opening formed in a housing, e.g. a sidewall, back wall or a front door of a switchgear, e.g. by means of screws or by clamping.

Another object of one or more embodiments of the present invention is to provide a switch gear which comprises a housing with at least one ventilation opening formed therein, which housing comprises a closed interior for accommodating electrical components. The switch gear is characterized in that an apparatus as described herein before is mounted to the ventilation opening. The apparatus is adapted to close the ventilation opening in the event of a sudden increase in pressure caused by an electric arc generated inside the housing.

One or more embodiments of the present invention is hereinafter described with reference to the accompanying drawings.

Figure 2:
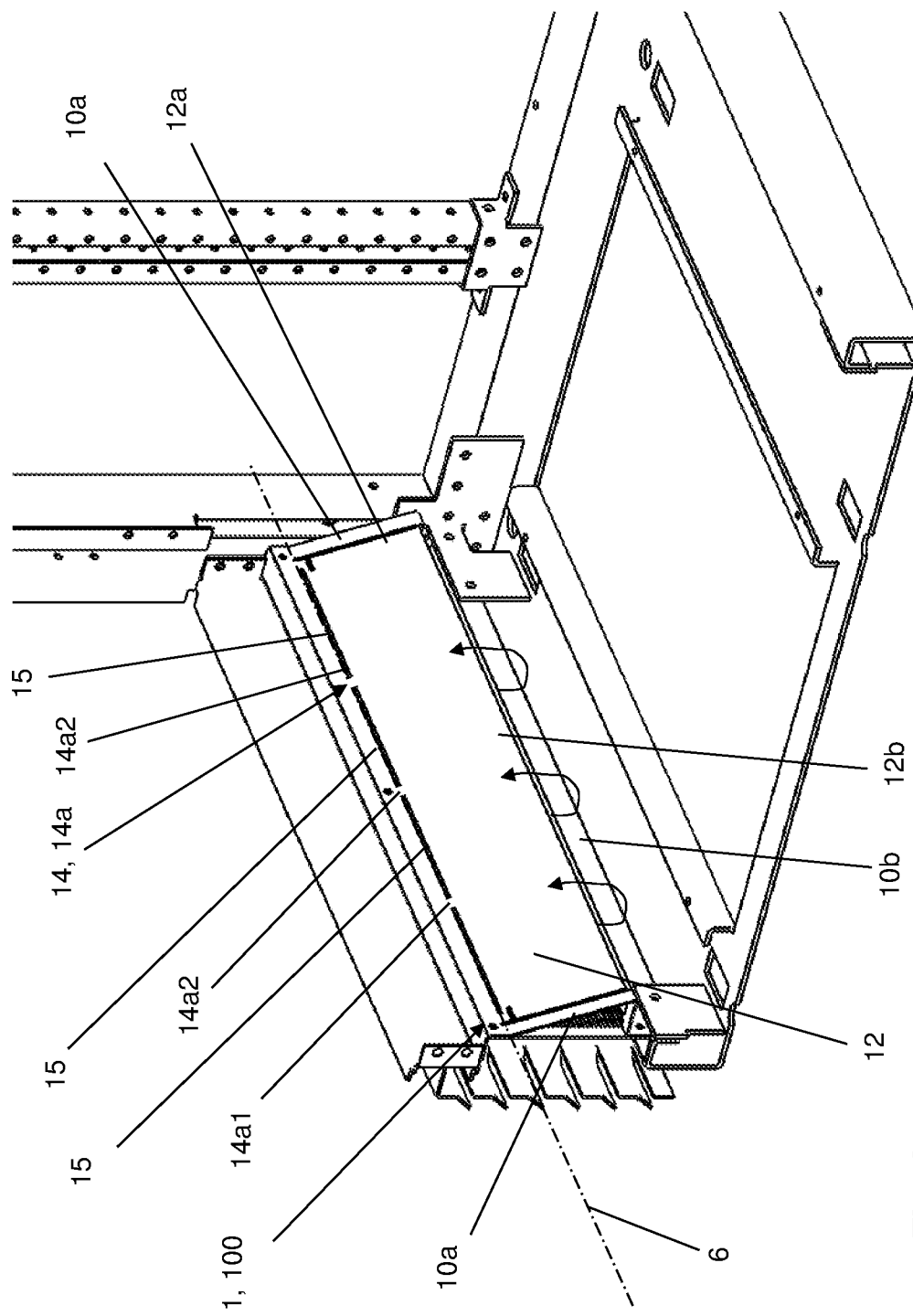
FIG. 2 is an enlarged view of the non-exploded opening and apparatus of FIG. 1.
Figure 3:
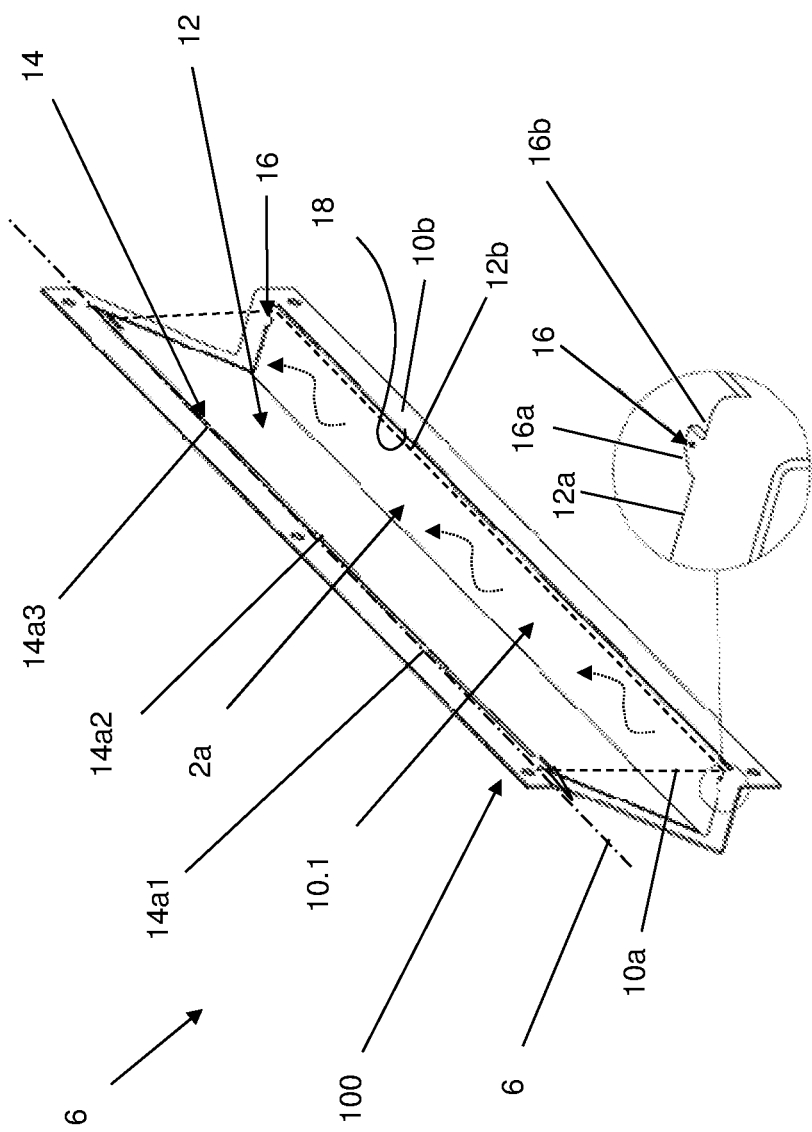
FIG. 3 is a schematic 3-dimensional view of the back side of an apparatus according to one or more embodiments of the invention having a single flap which is configured as an insert.

As it is shown in FIGS. 1 to 3, an apparatus 1 for closing a ventilation opening 2 in a housing 4a of a switch gear 4 in the event of a sudden increase in pressure caused by electric arcing, comprises a frame 10. The frame 10 which is shown in more detail in FIGS. 3 and 3A is configured to be mounted to the housing 4a of the switch gear 4 adjacent the ventilation opening 2, which is indicated in FIG. 1 in dashed lines and may be additionally covered by a ventilation cover. The Apparatus 1 further comprises a flap 12 mounted to the frame 10, which is pivotable around an axis 6 schematically indicated by dashed-dotted lines in FIGS. 1 and 4. The flap 12 can be pivoted around the axis 6 from an open position shown in FIGS. 1 and 3 in which the flap 12 overlaps the ventilation opening 2, into a closed position which is indicated in dashed lines in FIG. 3.

In the open position, air can freely flow though the opening 2 and a gap 2a, which is provided in the frame 10 of the apparatus 1 at the lower end of the flap 12, into the inside of the switch gear 4, in order to cool the electrical devices (not shown) accommodated therein. In the closed position, the flap 12 fully covers the opening 2 in the housing wall 4a of the switch gear 4 and preferably completely blocks the flow of air through the opening 2 to the outside of the switch gear 4.

The apparatus 1 further comprises spring elastic means 14 which urge the flap 12 into the open position, in order to always provide for a free air flow through the ventilation opening 2 and the gap 2a which is provided underneath the flap 12 during normal operation of the switch gear 4.

In order to prevent any hot gasses from evading through the opening 2 in the event of a pressure burst which is caused by an electric arc inside the housing and which pushes the flap into the closed position (dashed lines in FIG. 3), a retaining element 16 is associated to the flap 12 which is configured to mechanically lock the flap 12 in the closed position.

Although the flap 12 can be pivotally hinged to the frame 10 in a conventionally known manner, e.g. by means of a pivotable joint, and biased by a known spring, e.g. a helical spring mounted at the axis of rotation 6, the flap 12 is preferably integrally formed with the frame 10 and also with the spring elastic means 14. In this preferred embodiment of the invention, the flap 12, the frame 10 and the spring elastic means 14 may be integrally formed from sheet metal, and the spring elastic means 14 is provided as an angled connecting section 14a which interconnects the frame 10 and the flap 12.

The angled connecting section 14a comprises at least two angled or bow shaped webs 14a1, 14a2, 14a3, hereinafter designated as angled webs, which mechanically interconnect the flap 12 and the frame 10. Between each two of adjacent angled webs 14a1, 14a2, 14a3, there is formed a at least one longitudinal aperture 15 in the bent sheet metal of the connecting section 14a which extends in parallel to the axis of rotation 6. By varying the width and length of the aperture/s 15, the length and width of each of the webs 14a1, 14a2, 14a3 can be altered, in order to adapt the stiffness of the spring elastic means 14, that is the angled connecting section 14a, to a desired size, which allows for a save closure of the flap 12 in the event of arcing.

As it is further shown in FIGS. 3 and 3A, the retaining element 16 which is arranged at the frame 10, is preferably also integrally formed with the frame 10 from the same piece of sheet metal. As can be seen best from FIG. 3A, the retaining element 16 comprises a ramp section 16a which is followed by a recessed section 16b when viewed in the direction of the movement of the flap 12 into the closed position. This ramp section 16a increasingly projects/extends from the longitudinal edge portion of the frame 12 into the passage of the flap 12. The ramp section 16a contacts an adjacent longitudinal edge portion 12b of the flap 12 when the flap is passing by, right before it reaches the close position which is indicated by dashed lines in FIG. 3.

As a result of the sliding contact between the ramp portion 16a and the corresponding edge portion of the flap 12, the flap 12 is slightly deflected in the transversal direction (the direction of the axis 6) due to the elastic properties of its material, so that it can pass the ramp section 16b and enter the subsequent recessed section 16b following the ramp section 16a. In the recessed section 16b, which is located at a position corresponding to the closed position of the flap 12, the longitudinal edge portion 12b of the flap 12 flexes back from its deflected position into the free space provided by recessed section 16b. When the pressure inside the housing 4a drops after the spark is extinguished, the longitudinal edge portion 12a of the flap 12 is pushed back towards the open position of the flap 12 by the resilient means 14 and abuts against the back side of the ramp section 16a, thereby securely keeping the flap 12 in the closed position. In this closed position, the flap 12 is mechanically locked against any pivoting backwards into the open position and safely keeps the heated air and any toxic fumes caused by the sparking inside the housing 4a.

According to another aspect of one or more embodiments of the present invention, the frame 10 may comprise a stop 18 which prevents the flap 12 from pivoting beyond the closed position. As it is indicated in FIG. 3, the stop 18 may be formed by the transversal edge portion 10b of the frame 10, which extends in parallel to and along the transversal edge portion 12b of the flap 12 and which projects into the passage of the transversal edge portion 12b of the flap 12 when entering the closed position. In order to enable the transversal edge portion 12b of the flap 12 to abut the transversal edge portion 10a of the frame 10 which functions as the stop 18, the frame portion 10.1 in which the gap 2a is provided, is arranged at an angle of e.g. 60° relative to the frame section 10.2, in which the flap 12 is formed by cut outs.

Figure 4:
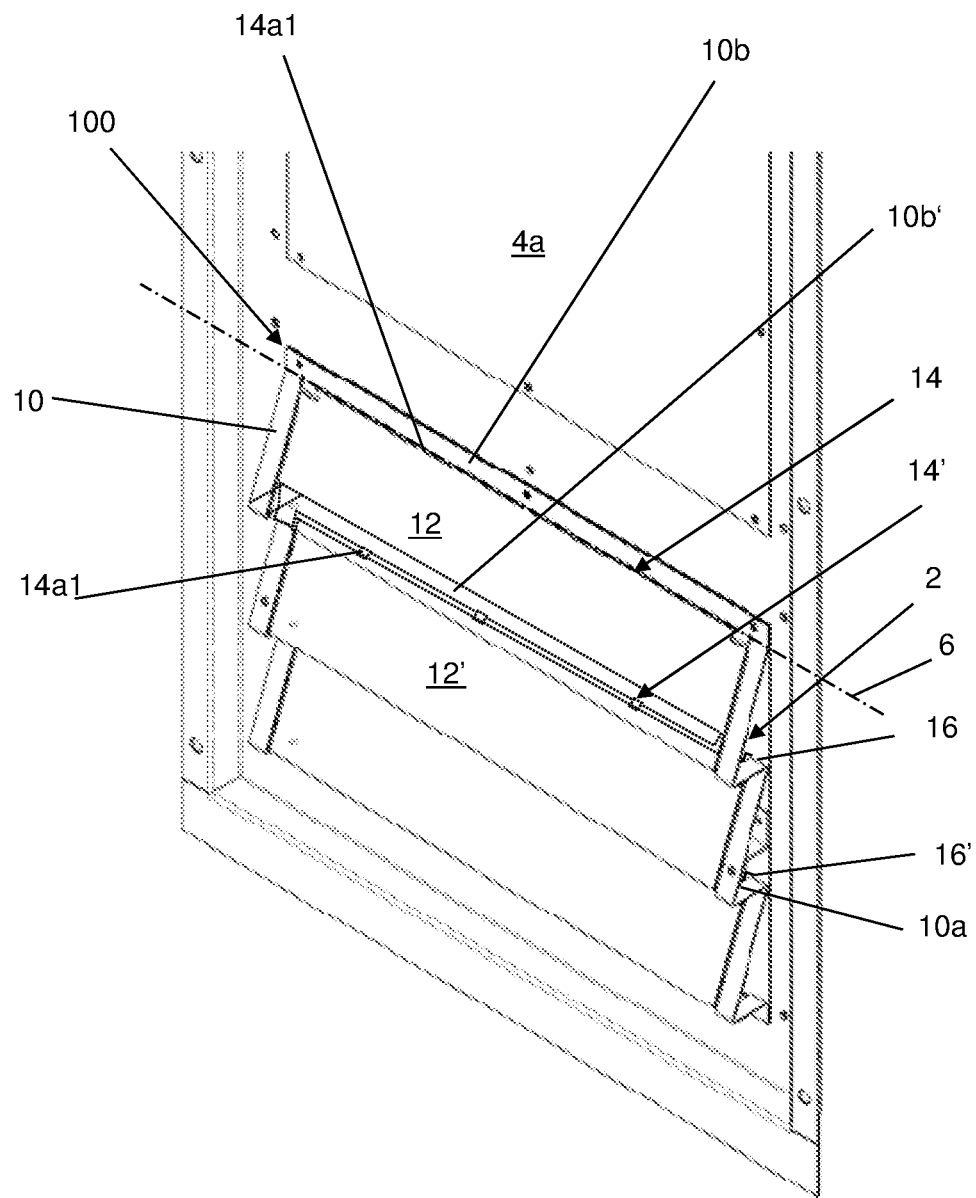
FIG. 4 is schematic view of the inner side of a switch gear having an enlarged ventilation opening, in which an apparatus with three single flaps arranged above each other is mounted an insert.

In order to cover bigger ventilation openings having a lager clear height, the frame 10 may comprise at least two (or even more) flaps 12, 12' which are arranged above each other in the same frame 10, as it is shown in FIG. 4. In this embodiment, each flap 12, 12' is pivotally mounted to the frame 10 and biased by an associated spring elastic means 14, 14' towards the open position which is formed at an additional transversal frame portion 10b' of the frame 10 which is indicated in dotted lines in FIG. 3 for the intermediated Flap 12'. In the same way as described herein before with regard to the Mono-Flap design, the spring elastic means 14' associated to the further flap 12' is formed by at least two angled webs, and the movement of the further flap 12' back to the open position is blocked by a retaining element 16' which interacts with the further flap 12'. The size of the flaps 12, 12' is such that all flaps 12, 12' together commonly cover the ventilation opening 2 and block the air flow in the closed position. For very large ventilation openings, there may be even provided three or more flaps 12, 12' which are arranged above each other in one and the same frame 10. In the same way as the Mono-Flap design of FIG. 3, also the multi-flap design of FIG. 4 can be (laser) cut from one and the same peace of sheet metal which is afterwards bent into the desired 3-dimensional shape having an all-around frame 10 with longitudinal frame portions which comprise a zigzag-shaped cross section as it is shown in FIG. 4.

According to another aspect of the present invention, the frame 10 may be configured as an insert 100 which integrally comprises all flap/flaps 12, 12', spring elastic means 14, 14' and retaining elements 16, 16' associated therewith. The insert 100 is adapted to be mounted in an opening 2 formed in a housing 4*a*, e.g. a sidewall, back wall or a front door of a switchgear 4, as it is shown in FIG. 4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LISTING OF REFERENCE NUMERALS

1 apparatus
2 ventilation opening
2*a* gap formed in frame at lower end of flap
4 switch gear
4*a* housing
6 axis
10 frame
10*a* longitudinal edge portion of frame
10*b* transversal edge portion of frame
10*b*' additional transversal frame portion
10.1 frame portion in which gap is provided
10.2 frame portion in which flap is formed by cut outs
12 flap
12*a* longitudinal edge portion of flap
12*b* transversal edge portion of frame
12' further flap
14 spring elastic means
14' further spring elastic means
14*a* connecting section
14*a*1-14*a*3 angled web
15 longitudinal aperture
16 retaining element
16' further retaining element
16*a* ramp section
16*b* recessed section
18 stop
100 insert

What is claimed is:

1. An apparatus for closing a ventilation opening in a housing of a switch gear for a sudden increase in pressure caused by electric arcing,
comprising:
a frame that is adapted to be coupled to the housing of the switch gear adjacent the ventilation opening;
a flap pivotally mounted at the frame, the flap being adapted to be moved from an open position in which the flap overlaps the ventilation opening keeping a gap that allows an airflow through the ventilation opening, into a closed position, in which the flap fully covers the ventilation opening and blocks the air flow; and
spring elastic means that urge the flap into the open position, and a retaining element that is adapted to mechanically lock the flap in the closed position after pivoting the flap from the open position into the closed position,
wherein the retaining element is integrally formed with the frame,
wherein the retaining element comprises a ramp section that, when viewed in a direction of movement of the flap towards the closed position, increasingly extends into a passage of the flap, and an adjoining recessed section following the ramp section, into which an edge portion of the flap extends in the closed position to mechanically lock the flap in the closed position in a form-locking manner, and
wherein the frame forms an insert comprising at least one flap, the spring elastic means and the retaining element associated therewith, which is adapted to be mounted in the ventilation opening formed in the housing or a front door of a switch gear.

2. The apparatus of claim 1,
wherein the flap is integrally formed with the frame and the spring elastic means.

3. The apparatus of claim 2,
wherein the flap, the frame and the spring elastic means are integrally formed of sheet metal, and that the spring elastic means is an angled connecting section that interconnects the frame with the flap.

4. The apparatus of claim 3,
wherein the angled or bent connecting section comprises at least two angled webs interconnecting the flap with the frame and a longitudinal aperture extending between the at least two angled webs along the angled or bent connecting section.

5. The apparatus of claim 1,
wherein the frame comprises a stop that prevents the flap from pivoting beyond the closed position.

6. The apparatus of claim 1,
wherein the frame comprises at least two flaps that are arranged above each other in the frame, wherein each flap is pivotally mounted to the frame and biased by an associated spring elastic means towards the open position, and wherein a respective retaining element is associated to each flap that is adapted to mechanically lock the flap associated with the respective retaining element in the closed position in which the at least two flaps commonly cover the ventilation opening and block the air flow.

7. A switch gear comprising the housing with the at least one ventilation opening formed therein, the housing comprising a closed interior for accommodating electrical components,
wherein the apparatus according to claim 1 is mounted to the ventilation opening, wherein the apparatus is adapted to close the ventilation opening in the event of the sudden increase in pressure caused by the electric arcing inside the housing.

8. An apparatus for closing a ventilation opening in a housing of a switch gear for a sudden increase in pressure caused by electric arcing, comprising:
a frame that is adapted to be coupled to the housing of the switch gear adjacent the ventilation opening;
a flap pivotally mounted at the frame, the flap being adapted to be moved from an open position in which the flap overlaps the ventilation opening keeping a gap that allows an airflow through the ventilation opening, into a closed position, in which the flap fully covers the ventilation opening and blocks the air flow; and
spring elastic means that urge the flap into the open position, and a retaining element that is adapted to mechanically lock the flap in the closed position after pivoting the flap from the open position into the closed position,
wherein the spring elastic means is arranged at an edge of the flap that is adapted to, in a closed position, contact the retaining element, and
wherein the spring elastic means is angled relative to a plane of the flap.

9. The apparatus of claim 8, wherein the retaining element is integrally formed with the frame.

10. The apparatus of claim 8, wherein the spring elastic means is integrally formed with the flap.

11. The apparatus of claim 10, wherein the flap, the frame, and the spring elastic means are integrally formed of sheet metal, and the spring elastic means is an angled connecting section that interconnects the frame with the flap.

* * * * *